(12) United States Patent
Griswold (10) Patent No.: US 8,011,532 B2
(45) Date of Patent: Sep. 6, 2011

(54) BAKING CUPS AND METHOD OF MANUFACTURING BAKING CUPS

(75) Inventor: Trudy Ellen Griswold, Monroe, WA (US)

(73) Assignee: Trudy Ellen Griswold, Monroe, WA (US)

( * ) Notice: Subject to any disclaimer, the term of this patent is extended or adjusted under 35 U.S.C. 154(b) by 994 days.

(21) Appl. No.: 11/595,355

(22) Filed: Nov. 9, 2006

(65) Prior Publication Data

US 2007/0102437 A1    May 10, 2007

Related U.S. Application Data

(60) Provisional application No. 60/735,534, filed on Nov. 10, 2005.

(51) Int. Cl.
*B65D 25/10* (2006.01)

(52) U.S. Cl. ..... 220/772; 220/771; 220/769; 220/573.4; 220/573.1

(58) Field of Classification Search .................. 220/772, 220/771, 755, 769, 573.1, 573.4; 99/279
See application file for complete search history.

(56) References Cited

U.S. PATENT DOCUMENTS

| | | | | | |
|---|---|---|---|---|---|
| 1,347,428 | A | * | 7/1920 | Wittekind | 220/573.4 |
| 1,776,358 | A | * | 9/1930 | Huff | 229/400 |
| 1,912,860 | A | * | 6/1933 | Ranhofer | 220/495.07 |
| 2,340,676 | A | * | 2/1944 | Mallard | 249/77 |
| 2,462,956 | A | * | 3/1949 | Gross | 220/23.4 |
| 2,796,067 | A | * | 6/1957 | McCutcheon et al. | 131/256 |
| 3,363,406 | A | * | 1/1968 | Miller | 96/148 |
| 3,483,908 | A | * | 12/1969 | Donovan | 221/260 |
| D226,279 | S | * | 2/1973 | Eyerly | D11/148 |
| 3,781,183 | A | * | 12/1973 | Doll | 428/136 |
| 3,861,576 | A | * | 1/1975 | Tolaas et al. | 229/5.84 |
| 3,874,548 | A | * | 4/1975 | Buff, Jr. | 220/507 |
| 4,039,797 | A | * | 8/1977 | Olsen | 219/732 |
| 4,085,861 | A | * | 4/1978 | Ruff | 220/713 |
| 4,124,160 | A | * | 11/1978 | Meyers et al. | 229/4.5 |
| 4,362,623 | A | * | 12/1982 | Holopainen | 210/493.5 |
| 4,407,414 | A | * | 10/1983 | Rey et al. | 206/553 |
| D278,116 | S | * | 3/1985 | Gavin et al. | D7/400 |
| 4,653,392 | A | * | 3/1987 | Gerber | 99/439 |
| 4,846,394 | A | * | 7/1989 | Swanson | 229/4.5 |
| 4,874,112 | A | * | 10/1989 | Mulder et al. | 221/1 |
| 5,120,439 | A | * | 6/1992 | McFarlin | 210/482 |
| 5,152,454 | A | * | 10/1992 | Warta et al. | 229/87.08 |
| 5,174,965 | A | * | 12/1992 | Jones et al. | 422/102 |
| D363,343 | S | * | 10/1995 | Azimi-Bolourian | D23/309 |
| D366,631 | S | * | 1/1996 | Weder et al. | D11/164 |
| D370,434 | S | * | 6/1996 | Weder et al. | D11/164 |

(Continued)

*Primary Examiner* — Anthony Stashick
*Assistant Examiner* — Christopher B McKinley
(74) *Attorney, Agent, or Firm* — Sprinkle IP Law Group (57) ABSTRACT

Embodiments of the invention provide a baking cup having a base section, a periphery section, and at least one tab extending beyond the periphery section. The tab(s) is configured to allow a user to lift and remove the baking cup from a baking utensil mold without having to touch the baking utensil or content of the baking cup. An exemplary method of using such a baking cup includes arranging the baking cup on a utensil, producing a baked good, and removing the baking cup from the utensil using the tab(s). The tab(s) may be formed part of or attached to the baking cup. In one embodiment, a method of manufacturing tabbed baking cups includes arranging shapes such as circles on a sheet of bakeproof material, utilizing the leftover to form tabs for the circles and cutting the circles and corresponding tab(s) to form the baking cups.

20 Claims, 8 Drawing Sheets

U.S. PATENT DOCUMENTS

| | | | | |
|---|---|---|---|---|
| D402,739 S | * | 12/1998 | Mc Clements | D23/309 |
| 6,308,859 B1 | * | 10/2001 | Johnson | 220/756 |
| D455,608 S | * | 4/2002 | McWilliams | D7/400 |
| 6,457,601 B1 | * | 10/2002 | Chappell | 220/573.4 |
| 6,506,445 B2 | * | 1/2003 | Popat et al. | 427/146 |
| 6,749,082 B1 | * | 6/2004 | Nickel | 220/738 |
| 7,150,050 B2 | * | 12/2006 | Sharp | 4/484 |
| 7,150,221 B2 | * | 12/2006 | Morgan | 99/428 |
| D538,644 S | * | 3/2007 | DeVine et al. | D9/431 |
| 7,353,635 B2 | * | 4/2008 | Westrate | 47/76 |
| D591,101 S | * | 4/2009 | Galante | D7/391 |
| 2002/0112614 A1 | * | 8/2002 | Zoss | 99/426 |
| 2002/0130130 A1 | * | 9/2002 | Apostolides | 220/573.4 |
| 2004/0036004 A1 | * | 2/2004 | De Groote | 249/155 |
| 2005/0184074 A1 | * | 8/2005 | Simmons et al. | 220/592.17 |
| 2005/0198925 A1 | * | 9/2005 | Perlman | 53/426 |
| 2005/0211101 A1 | * | 9/2005 | Finnie | 99/279 |
| 2007/0045329 A1 | * | 3/2007 | Yeh | 220/772 |

\* cited by examiner

BAKING CUPS AND METHOD OF MANUFACTURING BAKING CUPS

CROSS-REFERENCE TO RELATED APPLICATION(S)

The present application claims priority from U.S. Provisional Patent Application No. 60/735,534, filed Nov. 10, 2005, entitled "IMPROVED BAKING CUPS AND METHOD OF MANUFACTURING BAKING CUPS," which is hereby incorporated herein by reference for all purposes.

FIELD OF THE INVENTION

This invention relates generally to food preparation and packaging and more particularly to an improved design and manufacturing of baking cups useful for handling hot food such as baked goods.

BACKGROUND OF THE INVENTION

The conventional method for baking and packaging individual baked goods such as cupcakes and muffins typically includes placing fluted paper liners or cups into individual molds of baking utensils or pans, usually having a multiple of 6 molds per pan. An amount of batter is poured into each conventional liner and the pans are placed in an oven which may be heated to about 325° F.-350° F. for baking. The pans are removed from the oven when the batter is done and baked goods have formed.

Ideally, the baked goods are removed from the cooking utensil while the utensil is still hot. Such timely removal allows the baked goods to cool more quickly. Also, the utensil is available for subsequent baking sooner if baked goods are removed from the utensil while hot.

However, a user cannot easily lift hot baked goods in conventional liners without burning the fingers through contact with either the utensil and/or the hot baked good itself. Inverting the utensil to remove the baked goods is not a feasible solution because such inversion may damage the baked goods. In particular, the tops of the baked goods may be damaged by such inversion, adversely affecting their aesthetic appeal.

Therefore, an improved baking cup which can be removed from a baking utensil without burning the fingers is desirable. Further, an improved method of manufacturing baking cups is desirable, particularly if such a method may produce improved baking cups without requiring additional bake-proof material. Such improved method may also reduce waste associated with the baking cup manufacturing process.

SUMMARY OF THE INVENTION

Embodiments of the invention provide a baking cup comprising a base section, a periphery section, and at least one tab extending beyond the periphery section. The baking cup is configured to form a cup when placed in a baking utensil mold. The at least one tab is positioned to allow a user to lift the at least one tab to remove the baking cup from the mold without having to touch the mold, which can be very hot under certain circumstances. One way of utilizing such a baking cup includes arranging the baking cup on a utensil (e.g., a mold), producing a baked good or other hot food in the baking cup, and removing the baking cup from the utensil using the tab(s). The tab(s) may be integral or attached to the baking cup.

A method of manufacturing baking cups is also described. In one embodiment, the manufacturing method includes arranging circles on a sheet of bake-proof material and cutting baking cups from the sheet of baking material where each baking cup includes a circle and a tab cut from a remainder area adjacent the circle.

Embodiments of the invention provide the following advantages. Tabs facilitate moving baked goods by either a human or an automated system. The baking cup of the invention may be moved without contacting anything besides the tab(s). Therefore, tabs may prevent burns to human fingers moving hot baked goods. Also, tabs avoid damage to hot baked goods by avoiding direct contact of the baked goods. In addition to these functional advantages, the baking cups of this invention may have additional aesthetic appeal due to the tabs. The tabs may be configured into recognizable forms which may themselves lend to additional aesthetic appeal. Further, the tab configuration may facilitate novel decoration of the baked goods. Furthermore, the tabs may aid in removing the baking cup from the baked good. Thus, the tabs may enable baking cup removal which does not damage the baked good and/or which does not get frosting on ones fingers. Individuals with limited dexterity (e.g., children, arthritics, or elderly) may particularly benefit from baking cups having tabs.

Embodiments of the manufacturing method of the invention also provide advantages. The method includes arranging tab(s) in previously unused areas, thus reducing waste while providing functionality. For example, circles representing uncut, unformed baking cups are arranged on a sheet of bake-proof material. Around and adjacent these circles are unused areas. In one embodiment, tabs are formed from the material in these unused areas. Circles may be cut from the bake-proof material, where integral tab(s) extend beyond the radius of their respective circles. Thus, bake-proof material which was previously a waste product of previous manufacturing processes is converted through this invention to functional components of bake cups in the form of tabs.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, where like numerals are used to refer to like and corresponding parts of the various drawings. The features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples disclosed herein, while indicating preferred embodiments of the invention, are given by way of illustration only and not by way of limitation.

Figure 1:
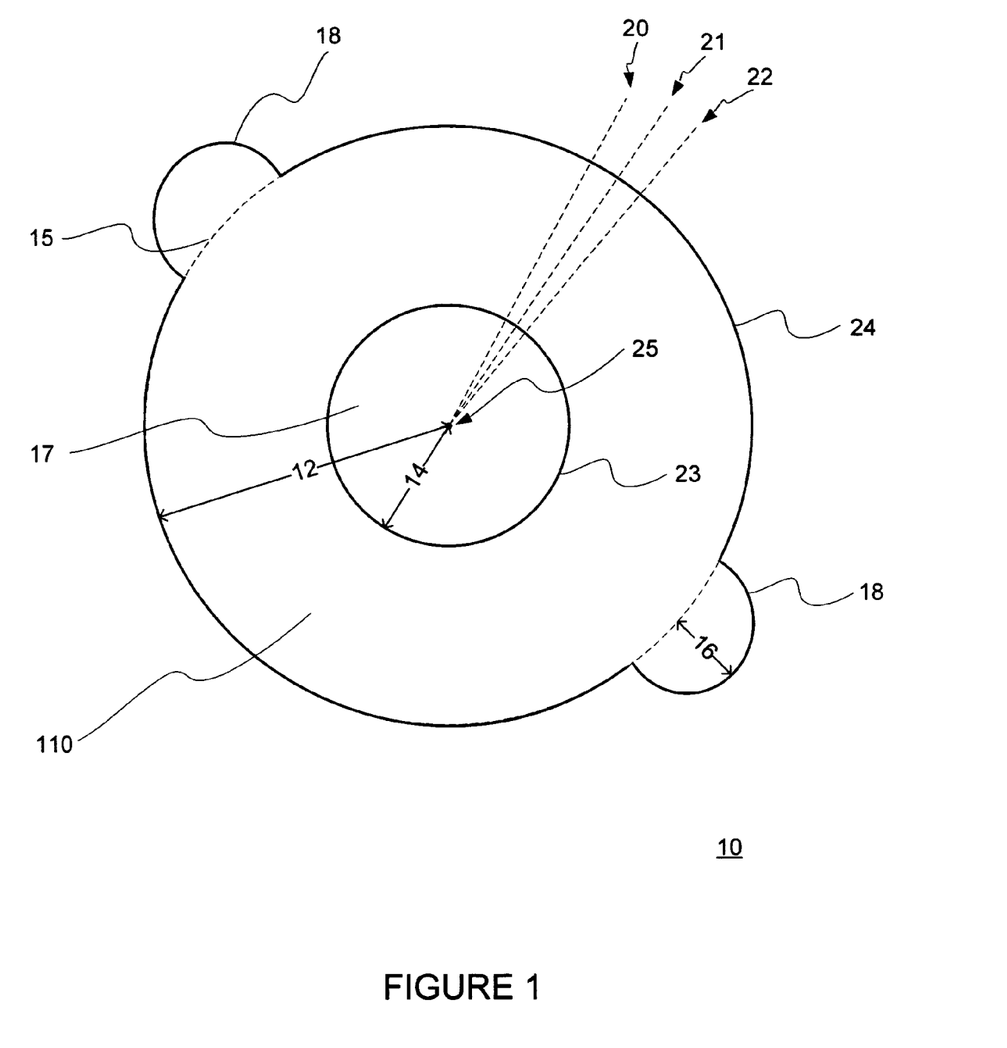
FIG. 1 is a schematic diagram of a baking cup according to one embodiment of the invention.

FIG. 1 illustrates one embodiment of a baking cup 10 with at least one tab 18, according to the invention. Within this disclosure, the term tab refers to a small flap, strip, loop, holder, or the like that is formed, attached, or otherwise made an integral part of a container or vessel for lifting, moving, hanging, or otherwise manipulating the container or vessel. Within this disclosure, term vessel refers to a hollow receptacle for holding food and/or drink and is used interchangeably with the term container. Baking cup 10 is an example of a hollow receptacle.

In FIG. 1, baking cup 10 is shown in a flattened configuration. Baking cup 10 may be manufactured from any material, such as a material suitable for baking (e.g., bake-proof material) or any high temperature food/drink preparation process. Such "bake-proof" material may include, but is not limited to, paper, waxed paper, aluminum foil, cardboard or other material that can withstand the temperatures and time in the oven required for a particular baking. It should be noted that within this disclosure the term "bake-proof" refers to a material that is suitable for the baking process for which it is intended. For example, a material that is bake-proof for the purpose of baking cupcakes may not be suitable for baking at higher temperatures. As an example, conventional baking cups without tabs include those manufactured by Reynolds® (e.g., Reynolds® baking cups and Reynolds® foil baking cups) and Georgia Pacific (e.g., white paper baking cups by Dixie®). The inventive tab(s) of the present invention can be used with any conventional baking cup or similar baking devices. In some applications, embodiments of the tabbed vessels disclosed herein may be manufactured from a material suitable for being or generating or coated with a protective barrier against heat from about 120° F. and above.

Baking cup 10 includes a base section ("base 17"), a periphery section 110, and at least one tab 18. When baking cup 10 is placed in the mold of a baking utensil, base 17 rests on the bottom of the mold and periphery 110 forms the side walls of a cup into which a liquid or mixture such as batter can be poured. Baking cup 10 may be removed from a baking utensil by holding and lifting tab(s) 18. Tab(s) 18 allow a user to remove baking cup 10 and hence a baked good from a hot baking utensil without having to directly touch or contact either the baking utensil or the baked good.

According to one embodiment, base 17 is a generally circular area within base circle 23. Base circle 23 is defined by center point 25 and base radius 14, where base circle 23 circumscribes center point 25. Typically, base 17 of baking cup 10 is free from creases or flutes. Periphery section 110 does not include base 17 and may be defined by base radius 14 and side radius 12. In one embodiment, arranged along approximately radial lines such as lines 20, 21, and 22, creases or flutes traverse periphery section 110. Creases or flutes may extend from base circle 23 to edge 24 of baking cup 10. Edge 24 circumscribes center point 25 along a course which may be defined by base radius 12 and tab radius 16.

When baking cup 10 is in its cup configuration, the creases above the periphery help give the periphery of the baking cup 10 a generally up-right orientation. As one skilled in the art can appreciate, the particular shape that baking cup 10 will take can depend on the shape of recesses (i.e., molds) in the baking pan.

In the embodiment shown in FIG. 1, side radius 12 is shown as approximately 2³⁄₁₆" (or 55.5 mm) and base radius 14 is shown as approximately ⅞" (or 22.2 mm). However, it is understood that all dimensions may vary as necessary to accommodate the application and/or needs of the user. For example, smaller baking cups may be needed for mini-cupcakes and larger baking cups may be needed for over-sized muffins. Further, in addition to baking, embodiments of the invention described herein may be modified, adapted, or otherwise applied for other applications. For example, without base 17, one embodiment of the invention may be a wrapper with one or more tabs. Such a tabbed wrapper may be utilized to hold a hot food or drink container. The tab(s) may be rigid or flexible and may be made of the same or different material as the wrapper or cup. The tab(s) need not be solid and may contain hole(s). The tab(s) as well as the hole(s) can be of various sizes and shapes. Accordingly, side radius 12 and base radius 14 may vary to accommodate dimensions required for respective usages. Additionally, baking cup 10 can have various base shapes (e.g., square, oval, rectangular, star, irregular, freeform, etc.).

As shown in FIG. 1, tab(s) 18 extend beyond a circumference defined by center point 25 and side radius 12. Also as shown, tab(s) 18 have tab radius 16 which, in one embodiment, may be approximately half inch (or 12.7 mm). As one skilled in the art can appreciate, tab(s) 18 may be of any size and shape sufficient to allow a user to manipulate (e.g., hold or grab) tab(s) 18 and lift cup 10 without having to touch or come in direct contact with the baking utensil and/or content of cup 10 (e.g., hot food or drink). As described above, a tab in embodiments of the invention can be just about any shape and size. For example, a rectangular tab extending about ¾" beyond the side radius 12 may be used. Further, tabs themselves may differ. That is, cup 10 may have two different tab(s) 18 and tab(s) 18 may differ from one baking cup 10 to another baking cup 10.

Two tab(s) 18 are shown in the example of FIG. 1. However, as few as one tab may be used. Further, more than two tabs (e.g., three, four, or higher) may be used. Tab(s) 18 may be configured as decorative shapes. Such decorative shapes may contribute to the decoration of the baked good. As one example, tab(s) 18 may be shaped as ears, and a cupcake baked in baking cup 10 may be decorated as a face using icing or embellishments to represent facial features such as eyes, nose, and mouth. As another example, tab(s) 18 may be shaped as leaves and a baked good in corresponding baking cup 10 may be decorated as a flower. Tab(s) 18 may also be colored or otherwise have decorative designs.

The outer extents of tab(s) 18 may commensurate with edge 24. In the exemplary embodiment shown in FIG. 1, edge 24 may be defined by center point 25 and side radius 12 plus tab radius 16. Therefore, edge 24 extends around tab(s) 18. As flutes may extend from base circle 23 to edge 24, flutes may extend through tab(s) 18. Consequently, tab(s) 18 may have a generally up-right orientation with respect to base 17. However, tab(s) 18 do not necessarily have the same orientation as periphery 110. For example, tab(s) 18 may include a crease along arc 15 defined by the side radius 12. Therefore, tab(s) 18 may be arranged in any orientation when baking cup 10 is in a mold ranging from vertical to horizontal. Further, tab(s) 18 may be arranged in a different orientation once removed from a mold. For example, tab(s) 18 may be vertical while baking cup 10 is in a mold, yet tab(s) 18 may be rearranged to a horizontal orientation after baking cup 10 is removed from the mold.

In FIG. 1, baking cup 10 is shown as a unitary device. However, according to other embodiments of the present invention, tab(s) 18 may be attached to periphery 110 by bonding or mechanical attachment. Thus, tab(s) 18 may extend outwardly from periphery section 110 past the circumference of periphery section 110, as shown in FIG. 1, from the side of periphery section 110 or in some other orientation.

Figure 2:
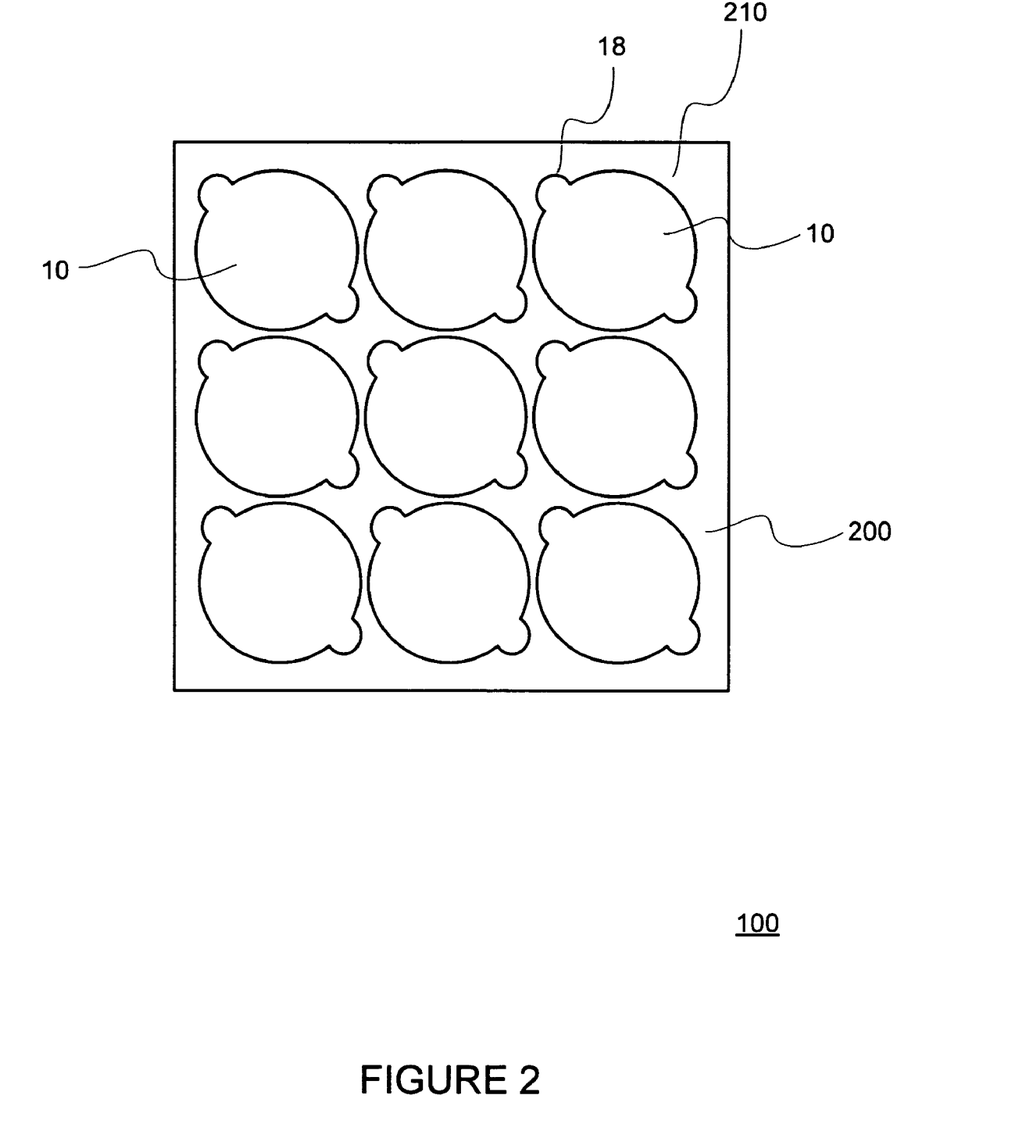
FIG. 2 illustrates a layout for manufacturing baking cups according to one embodiment of the invention.

FIG. 2 illustrates one embodiment of a layout 100 for manufacturing baking cups according to the invention. Baking cups 10 may be manufactured from a sheet 200 of bake-proof material or other material. Sheets 200 may be of any size and may accommodate any number of baking cups.

As shown, some areas of sheet 200 are not used in the manufacture of baking cups 10. For example, remainder areas 210 may not be used. Therefore, tab(s) 18 can be arranged in remainder areas 210. As the remainder areas 210 to manufacture conventional baking cups may be considered waste resulting from the manufacture of baking cups, creating tab(s) 18 according to the invention will reduce wasted material in area 210. Although baking cups 10 are shown as substantially similar with each shown as having two tabs, it is understood that a variety of baking cups may be manufactured concurrently. These baking cups may have the same or different tab configuration(s). It is also understood that other configurations are possible having other dimensions which may result in less wasted areas. Further, although a preferred method of manufacturing tabs from the same sheet of material (e.g., waxed paper, aluminum foil, etc.) of baking cups is described, it is understood that tabs may be manufactured separately from the baking cups.

Figure 3:
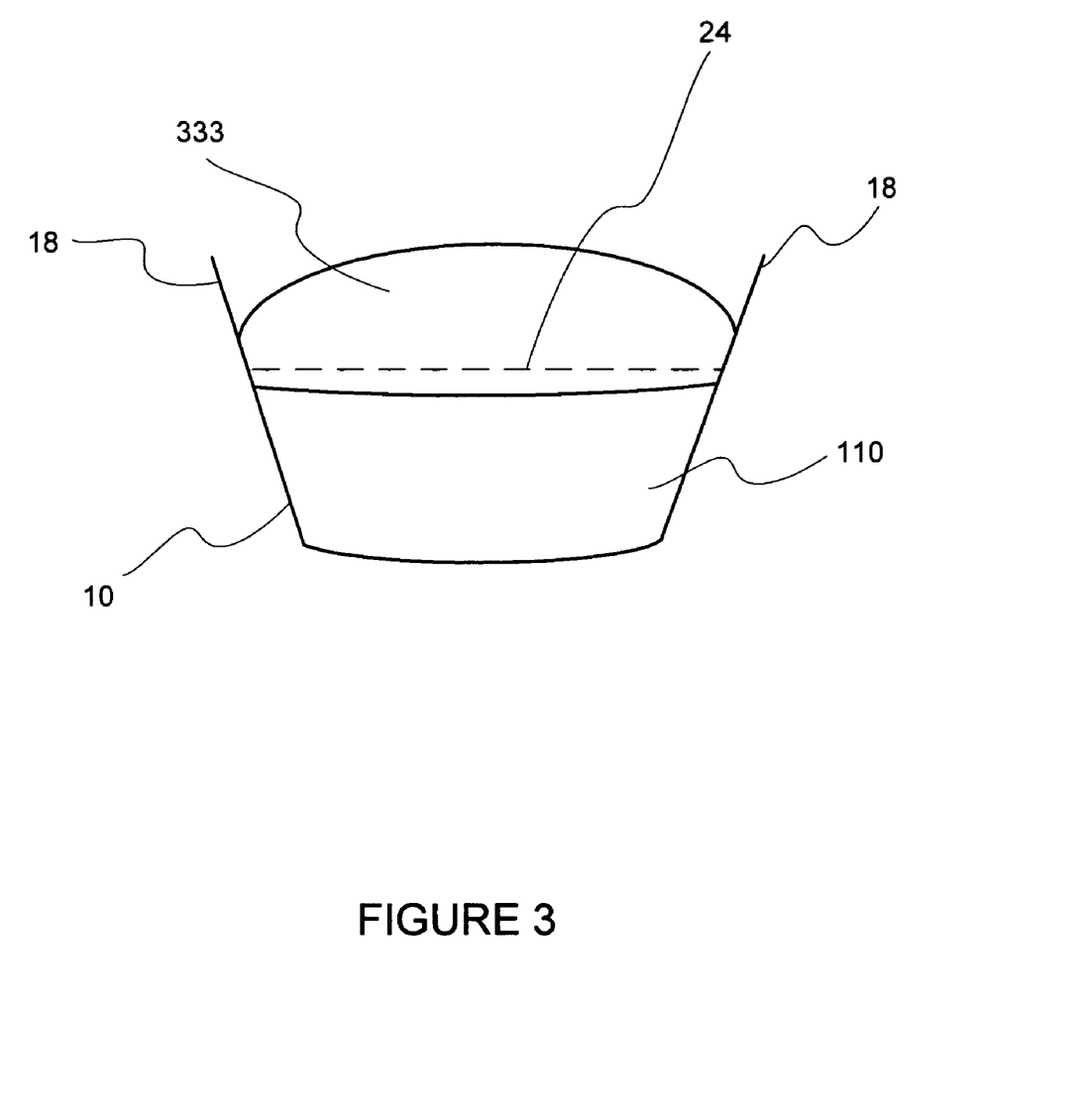
FIG. 3 is a side view of a baking cup according to one embodiment of the invention.
Figure 4:
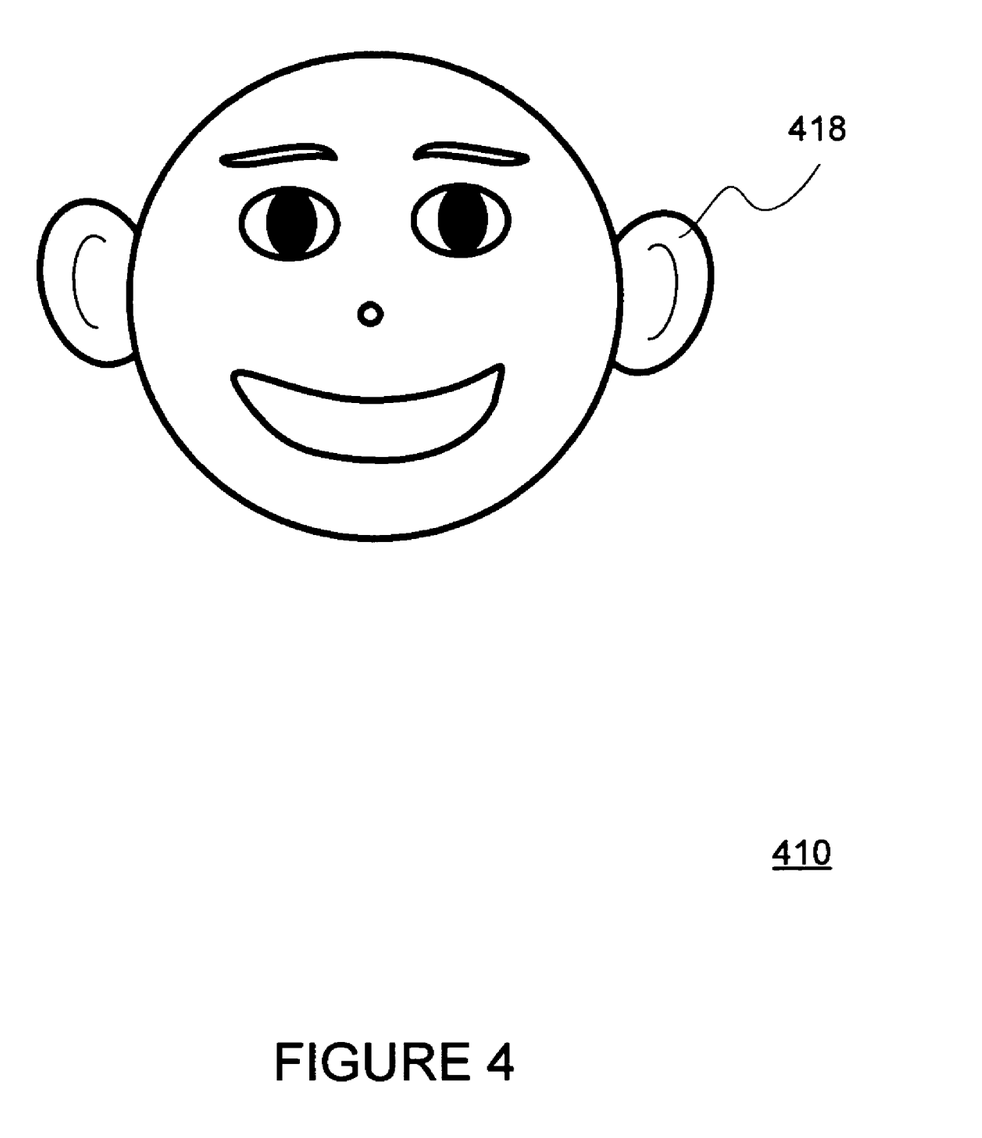
FIGS. 4-7 are top views of baking cups according to various embodiments of the invention, where each baking cup has tab(s) corresponding to a decorated baked good contained within.
Figure 5:
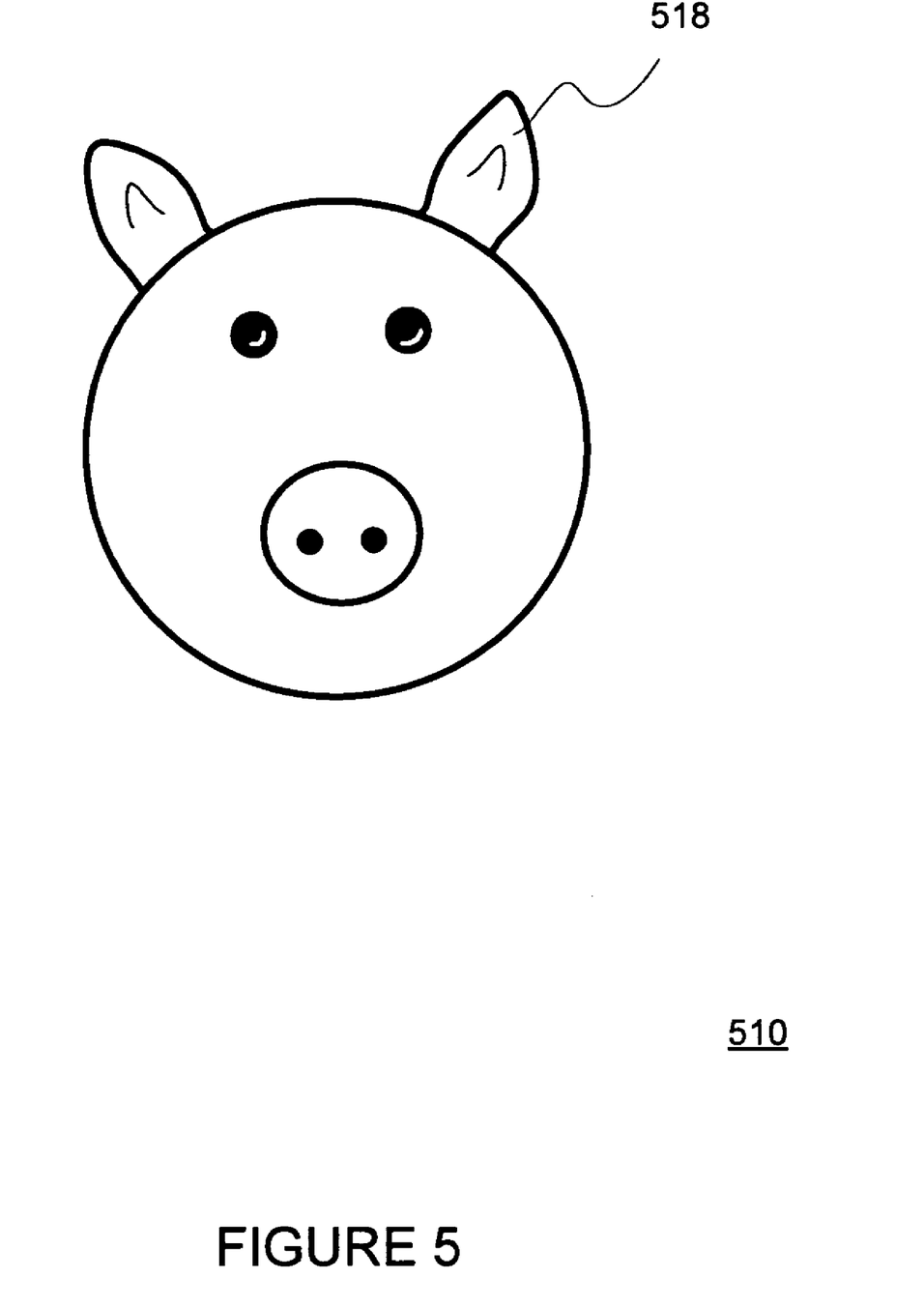
Figure 6:
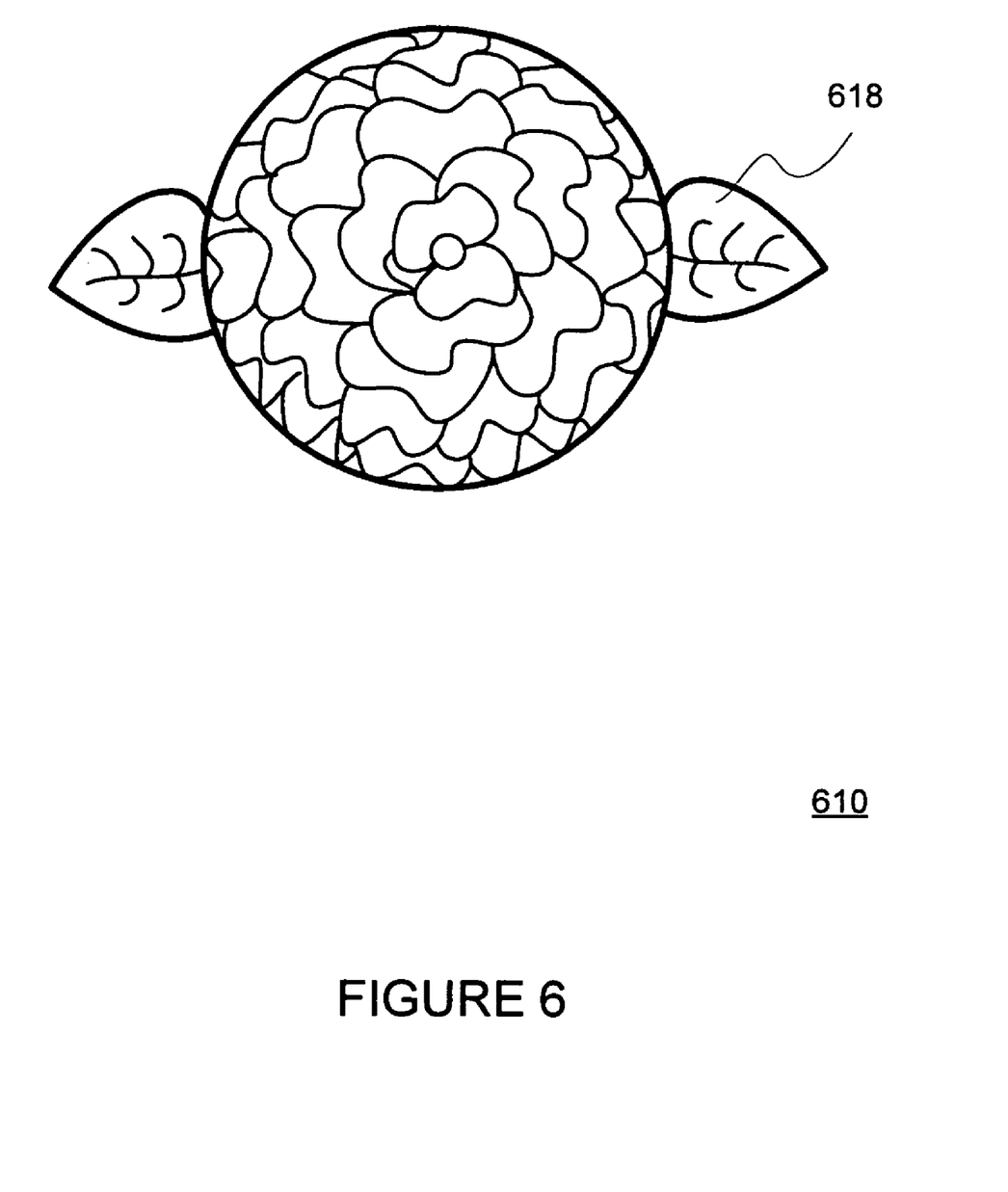
Figure 7:
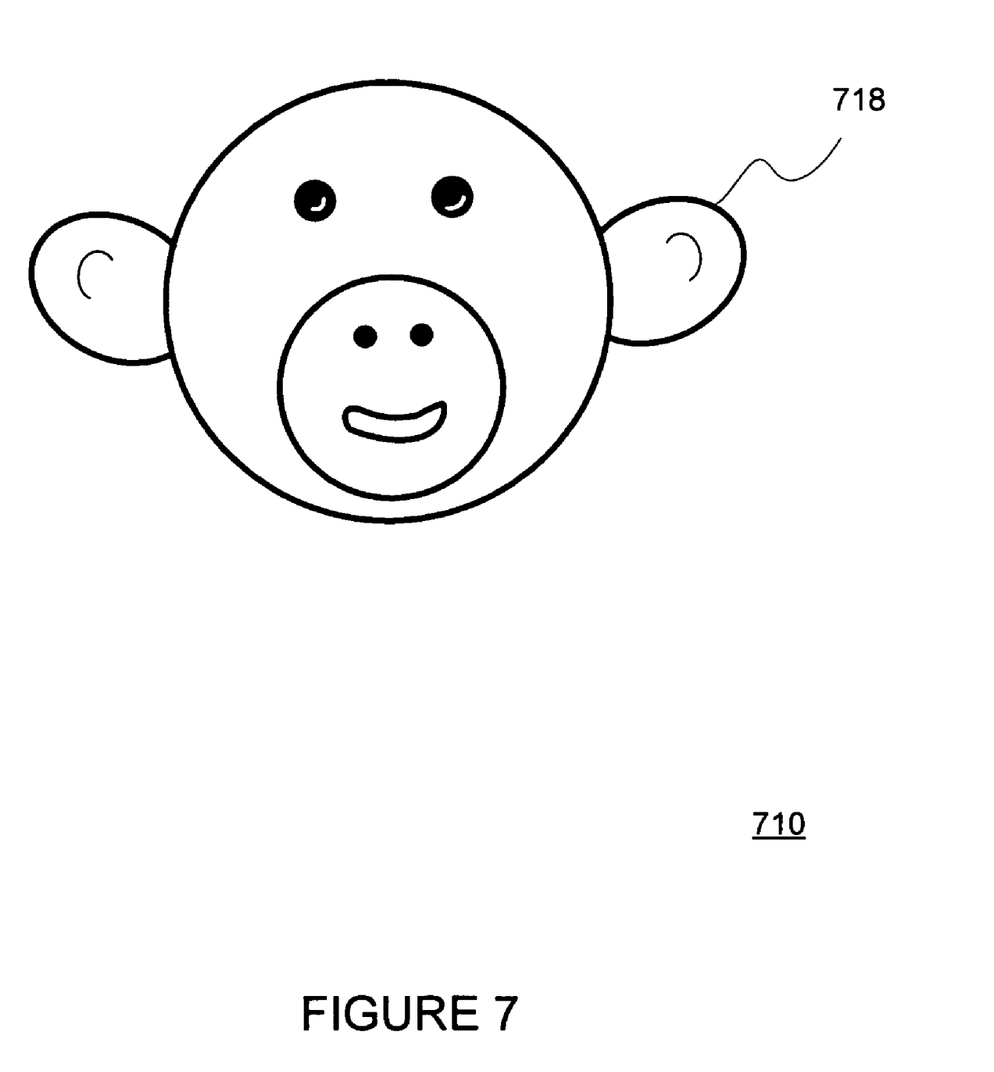

FIG. 3 schematically illustrates a baking cup in use according to one embodiment of the invention. A side view of an up-right orientation assumed by periphery area 110 is depicted. In this example, after reaching the optimal temperature baked good 333 rises, expands, and covers some portions of edge 24. One such portion of edge 24 is represented with a dashed line. Tabs 18 are shown extending beyond the risen height of baked good 333. In this way, baking cup 10, along with its content (i.e., baked good 333) may be lifted by manipulating tabs 18 and without contacting baked good 333.

FIGS. 4-7 are graphical representations of top views of baking ups in use according to embodiments of the invention. In each of FIGS. 4-7, tab(s) and perhaps edges are the visible portions of the baking cups. In the example shown in FIG. 4, the baked good contained in cup 410 is decorated to resemble a human face and tabs 418 of cup 410 are shaped to resemble human ears. In the example shown in FIG. 5, the baked good contained in cup 510 is decorated to resemble an animal face and tabs 518 of cup 510 are shaped to resemble animal ears. In the example shown in FIG. 6, the baked good contained in cup 610 is decorated to resemble a flower and tabs 618 of cup 610 are shaped to resemble leaves. In the example shown in FIG. 7, the baked good contained in cup 710 is decorated to resemble a monkey and tabs 718 of cup 710 are shaped to resemble monkey ears. As one skilled in the art can appreciate, a variety of figures may be created having the tabs as features or otherwise part of the overall design.

Figure 8:
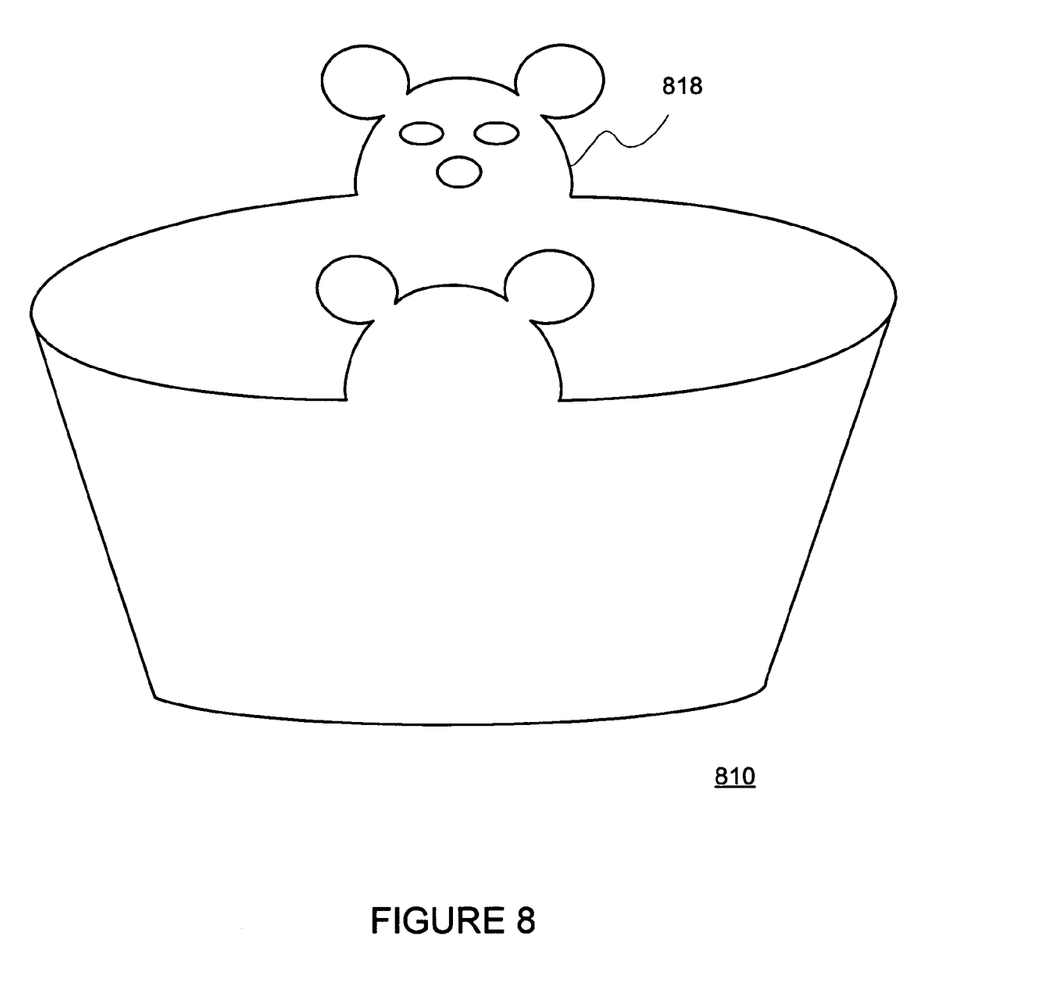
FIG. 8 is a perspective view of a baking cup according to one embodiment of the invention.

FIG. 8 is a graphical representation of a perspective view of a cup illustrating one embodiment of the invention. In this embodiment, the tabs themselves are fashioned into figures. Thus, tabs in embodiments of the invention are not limited to singular features such as, for example, monkey ears shown in FIG. 7. In some embodiments, tabs may be configured such that the tabs in and of themselves provide embellishment for a baked good. Further, there is no requirement that all tabs are similar on a single baking cup or food/drink containing vessel. Furthermore, although each tab may be a clearly recognizable figure in and of itself, a baked good in such a baking cup may include additional embellishment. For example, one embodiment of a baking cup may have two tabs, one is shaped like a head and the other shaped like feet. A baked good arranged there between could be decorated as an abdomen.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. For example, the tabs can be formed as part of a vessel or container designed to hold food and/or drink. In addition to allowing the vessel or container to be lifted without touching the content of the vessel or container, such tabs can provide and/or extend the distance between a user's fingers and portions of the vessel or container which may be hot to the touch. It is contemplated that all such changes and additional embodiments are within the scope and spirit of this invention. Accordingly, the scope of the invention should be determined by the following claims and their legal equivalents.

What is claimed is:

1. A baking cup comprising:
   a base section having a center point;
   a cup radius extending from the center point of the base section;
   an edge defined by the center point and the cup radius;
   a periphery section between the base section and the edge; and
   at least one tab extending outwardly from the edge of the periphery section, wherein the at least one tab has a tab radius, wherein the tab radius is smaller than the cup radius, and wherein the at least one tab, the base section, and the periphery section of the baking cup together form a tabbed vessel, wherein when the baking cup is placed in one of a plurality of molds of a single baking utensil, the base section of the baking cup rests on a bottom of the mold and the periphery section of the baking cup forms side walls of the tabbed vessel into which a batter is poured, wherein the tabbed vessel is bake-proof to withstand temperatures and time required for baking cupcakes in an oven, and wherein the at least one tab allows a user to manipulate and lift the baking cup from the baking utensil without having to touch the baking utensil or content of the baking cup.

2. The baking cup as recited in claim 1, wherein the at least one tab is formed part of or attached to the baking cup.

3. The baking cup as recited in claim 2, wherein the at least one tab comprises two tabs.

4. The baking cup as recited in claim 2, wherein the two tabs extend beyond the radius of the baking cup.

5. The baking cup as recited in claim 4, wherein the two tabs have same shapes, forms, and sizes.

6. The baking cup as recited in claim 4, wherein the two tabs have different shapes, forms, and sizes.

7. The baking cup as recited in claim 1, wherein the at least one tab is configured in a recognizable form.

8. The baking cup as recited in claim 1, wherein the at least one tab is flexible.

9. The baking cup as recited in claim 1, wherein the at least one tab is rigid.

10. The baking cup as recited in claim 1, wherein the at least one tab is of a material that is same as that of the periphery section.

11. The baking cup as recited in claim 1, wherein the at least one tab is of a material that is different from that of the periphery section.

12. A hollow receptacle, comprising:
a main body made of a bake-proof material capable of withstanding temperatures and time required for baking cupcakes in an oven, wherein the main body has:
a base section having a center point;
a side radius extending from the center point of the base section;
an edge defined by the center point and the side radius; and
a periphery section between the base section and the edge; and
at least one tab extending outwardly from the edge of the periphery section, wherein the at least one tab has a tab radius, wherein the tab radius is smaller than the side radius, wherein the main body and the at least one tab together form a tabbed vessel, wherein when the main body is placed in one of a plurality of molds of a single baking utensil, the base section rests on a bottom of the mold and the periphery section forms side walls of the tabbed vessel into which a batter is poured, wherein the at least one tab allows a user to manipulate and lift the hollow receptacle without having to touch the main body of the hollow receptacle or content of the hollow receptacle and wherein the at least one tab is formed part of or attached to the hollow receptacle.

13. The hollow receptacle of claim 12, wherein the at least one tab comprises two tabs extending beyond the radius of the hollow receptacle, wherein the two tabs have same or different shapes, forms, and sizes.

14. The hollow receptacle of claim 12, wherein the at least one tab is of a material that is same as or different from that of the main body of the hollow receptacle.

15. A method of manufacturing baking cups comprising:
arranging a plurality of circles on a sheet of bake-proof material, wherein each circle has a corresponding remainder area on the sheet of bake-proof material and wherein each circle has:
a base section having a center point;
a cup radius extending from the center point of the base section;
an edge defined by the center point and the cup radius; and
a periphery section between the base section and the edge;
utilizing the corresponding remainder area to form at least one tab for the corresponding circle, wherein the at least one tab has a tab radius, and wherein the tab radius is smaller than the cup radius;
cutting the plurality of circles and corresponding tabs out of the sheet of bake-proof material; and
manipulating the plurality of circles to form the baking cups, wherein when one of the baking cups is placed in one of a plurality of molds of a single baking utensil, the base section of the baking cup rests on a bottom of the mold and the periphery section of the baking cup forms side walls of the baking cup into which a batter is poured, wherein the at least one tab allows a user to manipulate and lift the baking cup from the baking utensil without having to touch the baking utensil or content of the baking cup.

16. The method as recited in claim 15, wherein the plurality of circles and the corresponding tabs are cut together and wherein each cut piece has a circle and one or more tabs.

17. The method as recited in claim 15, wherein the plurality of circles and the corresponding tabs are cut separately, further comprising attaching the at least one tab to each corresponding circle.

18. The method as recited in claim 17, wherein manipulating the plurality of circles to form the baking cups further comprises fluting a periphery of each baking cup.

19. The method as recited in claim 18, wherein fluting a periphery of each baking cup comprises fluting the at least one tab.

20. The method as recited in claim 17, wherein each of the baking cups conforms to a shape of the mold of the baking utensil.

* * * * *